(12) United States Patent
Lee (10) Patent No.: US 9,412,416 B2
(45) Date of Patent: *Aug. 9, 2016

(54) LOCATION-BASED MEDIA PRESENTATION

(75) Inventor: Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/244,230

(22) Filed: Sep. 23, 2011

(65) Prior Publication Data

US 2012/0021773 A1 Jan. 26, 2012

Related U.S. Application Data

(63) Continuation of application No. 11/378,790, filed on Mar. 16, 2006, now Pat. No. 8,056,112.

(51) Int. Cl.
| | | |
|---|---|---|
| *H04N 7/025* | (2006.01) | |
| *H04N 7/173* | (2011.01) | |
| *H04N 7/16* | (2011.01) | |
| *G11B 27/10* | (2006.01) | |
| *H04N 21/45* | (2011.01) | |
| *G11B 27/11* | (2006.01) | |

(52) U.S. Cl.
CPC .............. *G11B 27/105* (2013.01); *G11B 27/11* (2013.01); *H04N 21/4524* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 6,154,689 A | | 11/2000 | Pereira et al. |
| 6,493,506 B1 * | | 12/2002 | Schoner et al. ............... 386/334 |
| 7,131,132 B1 * | | 10/2006 | Gehlot et al. .................. 725/10 |
| 7,434,153 B2 | | 10/2008 | Liu et al. |
| 7,526,378 B2 * | | 4/2009 | Genz ............................. 701/433 |
| 2001/0054180 A1 * | | 12/2001 | Atkinson ........................ 725/32 |
| 2003/0005453 A1 * | | 1/2003 | Rodriguez et al. ............. 725/87 |
| 2005/0096753 A1 * | | 5/2005 | Arling et al. .................... 700/11 |
| 2005/0160368 A1 * | | 7/2005 | Liu et al. ....................... 715/762 |

(Continued)

FOREIGN PATENT DOCUMENTS

| | | |
|---|---|---|
| EP | 1 111 342 | 6/2001 |
| EP | 1 267 315 | 12/2002 |

(Continued)

OTHER PUBLICATIONS

International Search Report and Written Opinion from corresponding PCT Application No. PCT/US2007/006420, mailed Jul. 26, 2007, 15 pages.

(Continued)

*Primary Examiner* — Brian T Pendleton
*Assistant Examiner* — Dika C. Okeke
(74) *Attorney, Agent, or Firm* — Kilpatrick Townsend & Stockton LLP (57) ABSTRACT

Media can be presented based on location associated with presentation of media (e.g., physical location of a device that is to present media). Presentation of media can be effectively controlled in order to automatically present a first media content (e.g., a list of songs, an album) in accordance with a first set of media presentation attributes or parameters (e.g., volume associated with presentation of audible media) at a first location, while a second media content is automatically presented in accordance with a second set of media presentation attributes or parameters when the current location is changed to a second location.

19 Claims, 8 Drawing Sheets

(56) References Cited

U.S. PATENT DOCUMENTS

2005/0219055 A1* 10/2005 Takai et al. ............... 340/573.1
2006/0224690 A1* 10/2006 Falkenburg et al. .......... 709/217
2007/0161382 A1* 7/2007 Melinger ............... H04L 67/18
　　　　　　　　　　　　　　　　　　　　　　　　　　455/456.1
2007/0171091 A1* 7/2007 Nisenboim et al. ...... 340/825.69

FOREIGN PATENT DOCUMENTS

| | | |
|---|---|---|
| EP | 1 378 912 | 1/2004 |
| EP | 1 585 134 | 10/2005 |
| EP | 1585134 A1 * | 10/2005 |
| EP | 1 653 469 | 5/2006 |
| WO | 97/24581 | 7/1997 |
| WO | 2006/085287 | 8/2006 |

OTHER PUBLICATIONS

Office Action dated May 19, 2009 from European Application No. 07 753 072.3.
"IPod," Wikipedia, the free encyclopedia, http://en.wikipedia.org/wiki/Ipod, 20 pages.
"ITunes," Wikipedia, the free encyclopedia, http://en.wikipedia.org/wiki/ITunes, 15 pages.
"Global Positioning System," Wikipedia, the free encyclopedia, http://en.wikipedia.org/wiki/GPS, 20 pages.
International Preliminary Report on Patentability for International PCT Application No. PCT/US2007/006420, mailed Sep. 16, 2008, 10 pages.
Decision to Refuse for European Application No. 07753072.3, Aug. 9, 2012, 21 pages.

* cited by examiner

LOCATION-BASED MEDIA PRESENTATION

CROSS REFERENCE TO RELATED APPLICATION

This application is a continuation of and claims priority to co-pending and commonly owned U.S. patent application Ser. No. 11/378,790, filed Mar. 16, 2006, entitled "LOCATION-BASED MEDIA PRESENTATION," which is incorporated herein by reference in its entirety and for all purposes.

BACKGROUND

Traditional electronic devices (e.g., cassette players, analog television receivers) have been used to present media for some time now. More recently, digital media players (e.g., portable music players, MP3 players) have become especially popular partly because they can store media as digital data. Generally, media stored as digital data ("media") can be presented in numerous forms including audible, visual, and audio-visual forms. Digital data can be transported electronically, for example, as a digital file stream of data that is accessible by a variety of computing devices available today (e.g., personal computers, media players, personal assistants, wireless phones). Typically, digital media includes at least digital content (or "content") that represents that actual content of information stored in a digital form. Digital content can, for example, be the content of a printed book, a song in audible form or in an audio-visual form (e.g., a video), movies, sports broadcasts, or news in a variety of forms including text, audio, or audio-visual. As such, digital media players can present one or more forms of media (e.g., audio, video, audio-visual) via various audio (e.g., speakers, headphones) and video output devices (e.g., LCD, CRT displays).

Given the popularity and extended use of digital media, improved techniques for presentation of digital data would be useful.

SUMMARY

Broadly speaking, the invention related to techniques for presentation of digital media. It will be appreciated that the techniques can be used to present media based on a location associated with the presentation of media (e.g., a physical, virtual, or assigned location of a device that presents media). In other words, the improved techniques can be used to effectively control presentation of media based on location (e.g., physical location of a device that is to present media). As such, presentation of digital media can, for example, be effectively controlled in order to present a first media content (e.g., a list of songs, an album) in accordance with a first set of media presentation attributes or parameters (e.g., volume associated with presentation of audible media) at a first location, while a second media content is presented in accordance with a second set of media presentation attributes or parameters at a second location, and so on.

In accordance with one aspect of the invention, Media Presentation Environment (MPE) can be effectively defined for a location (e.g., geographical location, area, or region, a virtual or assigned location on real-geographical or virtual map). The Media Presentation Environment (MPE) can effectively define what to present (or media content) for the location and/or how to present media (or media presentation information) for the location. As such, Media Presentation Environment (MPE) can effectively define: (a) digital media content ("content") to be presented and/or (b) media presentation information effectively defining how to present the media content defined by the Media Presentation Environment (MPE), other media content (e.g., default, whatever is being presented), or generally any media content to be presented for that location.

In one embodiment, Media Presentation Environment (MPE) is provided as data for a computing device that can present media (e.g., a digital media player). Media Presentation Environment (MPE) data can be effectively assigned to or defined for presentation of media at a particular physical location, region, area, space, etc. Media Presentation Environment (MPE) data can include media content data that effectively specifies, describes, identifies, includes, or references particular media content (e.g., a song, a list of songs, a directory) to be presented at a particular physical location, region, area, space, etc. Alternatively, or in addition to the media content data, the Media Presentation Environment (MPE) data can include media presentation data that effectively specifies or describes how to present content at that particular physical location, region, area, space, etc.

The invention can be implemented in numerous ways, including a method, an apparatus, a computer readable medium, a computing device, or a signal embodied in a carrier wave. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

As noted on the background section, improved techniques for presentation of digital data would be useful. Accordingly, the invention pertains to improved techniques for presentation of digital media. It will be appreciated that the techniques can be used to present media based on a location associated with the presentation of media (e.g., a physical, virtual, or assigned location of a device that presents media). In other words, the improved techniques can be used to effectively control presentation of media based on location (e.g., physical location of a device that is to present media). As such, presentation of digital media can, for example, be effectively controlled in order to present a first media content (e.g., a list of songs, an album) in accordance with a first set of media presentation attributes or parameters (e.g., volume associated with presentation of audible media) at a first location, while a second media content is presented in accordance with a second set of media presentation attributes or parameters at a second location, and so on.

In accordance with one aspect of the invention, Media Presentation Environment (MPE) can be effectively defined for a location (e.g., geographical location, area, or region, a virtual or assigned location on real-geographical or virtual map). The Media Presentation Environment (MPE) can effectively define what to present (or media content) for the location and/or how to present media (or media presentation information) for the location. As such, Media Presentation Environment (MPE) can effectively define (e.g., identify, describe, specify, include, or reference) (a) digital media content ("content") to be presented and/or (b) media presentation information effectively defining how to present the media content defined by the Media Presentation Environment (MPE), other media content (e.g., default, whatever is being presented), or generally any media content to be presented for that location.

In one embodiment, Media Presentation Environment (MPE) is provided as data for a computing device that can present media (e.g., a digital media player). Media Presentation Environment (MPE) data can be effectively assigned to or defined for presentation of media at a particular physical location, region, area, space, etc. Media Presentation Environment (MPE) data can include media content data that effectively specifies, describes, identifies, includes, or references particular media content (e.g., a song, a list of songs, a directory) to be presented at a particular physical location, region, area, space, etc. Alternatively or in addition to the media content data, the Media Presentation Environment (MPE) data can include media presentation data that effectively specifies or describes how to present content at that particular physical location, region, area, space, etc.

In order to detect the location of the computing device, the computing device can be equipped with a Gravitational Positioning System (GPS) receiver in accordance with one embodiment of the invention. The GPS can detect the physical location of the computing device. If Media Presentation Environment (MPE) data has been assigned or defined for a specific location, media can be presented in accordance with Media Presentation Environment (MPE) data. In other words, media content and/or presentation information provided by the Media Presentation Environment (MPE) data can be used to present the desired media content in accordance with one or more presentation attributes or parameters. By way of example, a first list of songs can be assigned for presentation at a first location (e.g., library) and presented at lower volumes in accordance with media presentation data. Another list of songs can be assigned to a second location (e.g., gym) and presented at higher volumes. A movie can be assigned to yet another location or while traveling between two locations, and so on. This allows a media player to be configured to automatically select the appropriate media and present it in accordance with any defined presentation attributes or parameters when the media player is at the first location (e.g., library), or the second location (e.g., gym), and so on.

Embodiments of these aspects of the invention are discussed below with reference to FIGS. 1A-7. However, those skilled in the art will readily appreciate that the detailed description given herein with respect to these figures is for explanatory purposes as the invention extends beyond these limited embodiments.

Figure 1A:
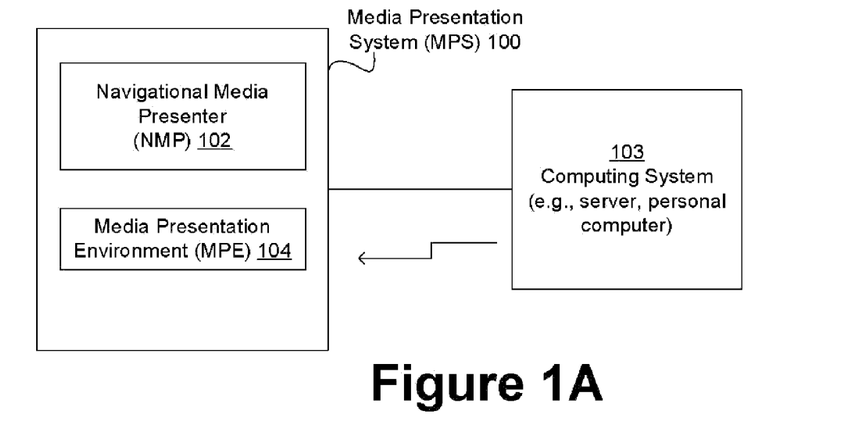
FIGS. 1A-B depict a Media Presentation System (MPS) in accordance with one embodiment of the invention.

FIG. 1A depicts a Media Presentation System (MPS) 100 in accordance with one embodiment of the invention. It will be appreciated that the Media Presentation System (MPS) 100 can, for example, be implemented as a device that can present media represented as digital data (e.g., computing device with at least one processor and memory for storing digital data).

More particularly, the Media Presentation System (MPS) 100 can present media based on a location (e.g., a physical, virtual, assigned or perceived location). In other words, the Media Presentation System (MPS) 100 can be configured to automatically (e.g., without requiring input from a human being) vary presentation of media as a function of a location. It will be appreciated that the Media Presentation System (MPS) 100 is especially well suited for implementation as a mobile or portable device that can be easily moved (e.g., a mobile phone, a mobile media-player, a laptop computer).

Figure 1B:
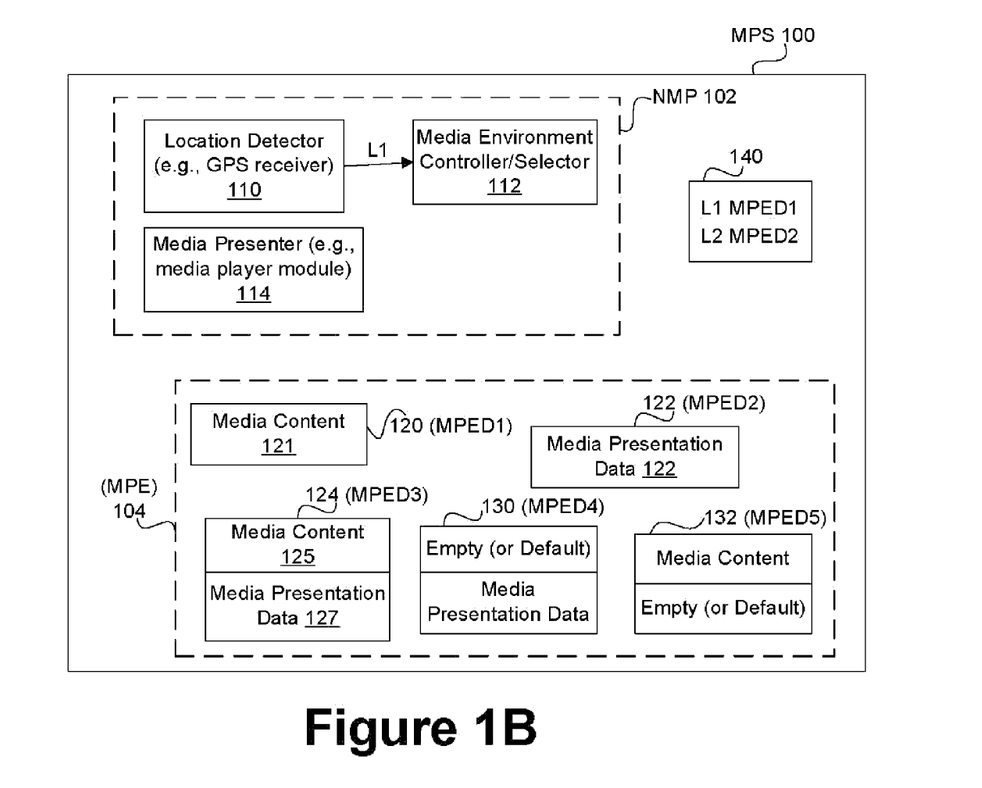

Referring to FIG. 1A, the Media Presentation System (MPS) 100 includes a Navigational Media Presenter (NMP) 102 and Media Presentation Environment (MPE) 104. The Navigational Media Presenter (NMP) 102 effectively uses the Media Presentation Environment (MPE) in order to determine the appropriate media presentation for a particular location. To further elaborate, FIG. 1B depicts the Media Presentation System (MPS) 100 in greater detail in accordance with one embodiment of the invention. The Media Presentation System (MPS) 100 depicted in FIG. 1B can present media responsive to various physical locations as depicted by a location detector (e.g., GPS receiver) 110. In addition to the location detector 110, Media Environment Controller/Selector 112, and Media Presenter 114 are provided. The Media Environment Controller/Selector 112 can effectively select the appropriate Media Presentation Environment data in response to the physical location detected by the location detector (e.g., GPS receiver) 110. By way of example, when the location detector 110 detects a physical location L1, the Media Environment Controller/Selector 112 can select the particular Media Presentation Environment (MPE) associated with the location L. Namely, Media Presentation Environment Data 120 (or MPED1). In this example, the Media Presentation Environment (MPE) 120 includes media content 121 (e.g., digital file(s), or item(s)) that can be presented by the Media Presenter (e.g., media-player) 114. Referring again to FIG. 1B, a Media Presentation Environment Data 122 (or MPED2) includes data that effectively describes how to present media content for another location L2. In general, Media Presentation Environment (MPE) 104 can include data representing media content (media content) and/or media presentation data that effectively describes how to present media content. Referring to FIG. 1B, Media Presentation Environment Data 124 (or MPED3) includes both media content 125 and media presentation data 127. Those skilled in the art will appreciate that Media Presentation Environment (MPE) can be represented in numerous forms effectively defining media content and/or how to present media content. As such, the invention is not dependent on any specific format used to represent media content or how to present media content.

Figure 2:
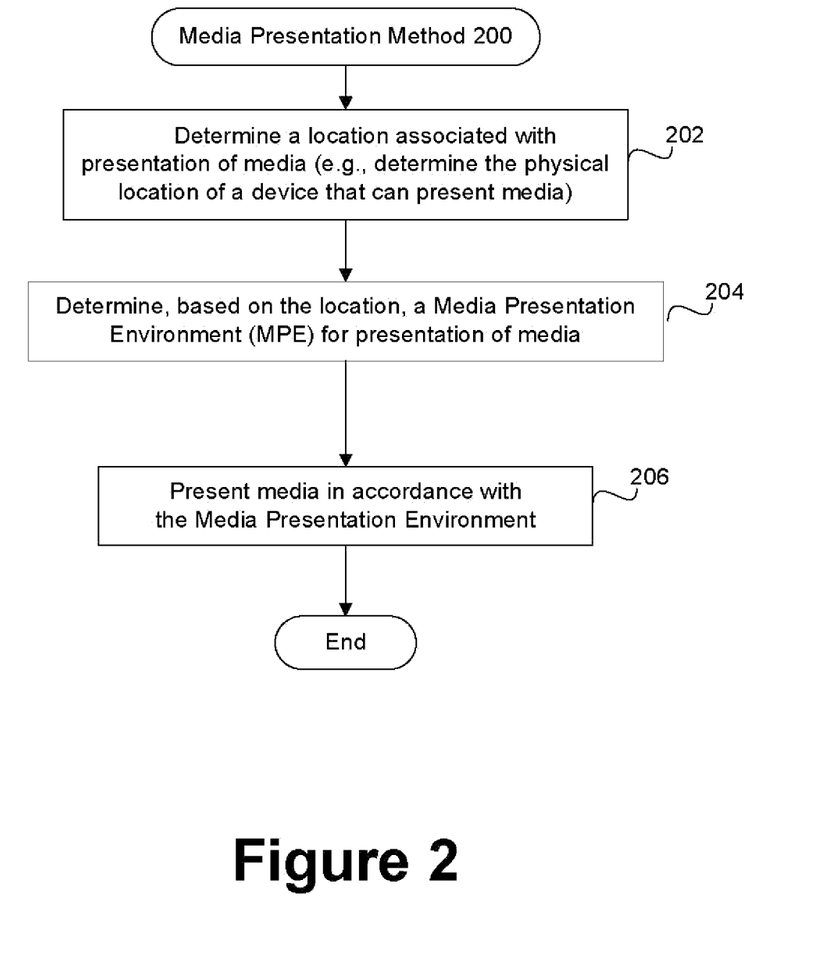
FIG. 2 depicts a media presentation method for presenting media in accordance with one embodiment of the invention.

FIG. 2 depicts a media presentation method 200 for presenting media in accordance with one embodiment of the invention. The media presentation method 200 can, for example, be used by the Media Presentation Environment (MPE) 100 shown in FIG. 1A. Initially, a location for presentation of media is determined (202). This location can, for example, be the physical location of a device that presents or facilitates presentation of media (e.g., physical location of a media-player). Based on the location, a Media Presentation Environment (MPE) is determined (204) in order to present media for the location. Accordingly, media is presented (206) for the location in accordance with the Media Presentation Environment (MPE).

Referring back to FIG. 1B, it should be noted that detection of another location or a change in the current location can result in selection of another Media Presentation Environment (MPE). By way of example, when the Location Detector 110 detects that the physical location has changed from L1 to L2, the Media Environment Controller/Selector 112 effectively selects Media Presentation Environment 122 (MPED2). In this example, Media Presentation Environment 122 includes media presentation data effectively describing how to present or change the presentation of media content in response to detection of location L2 (e.g., lower the volume associated with audible media presentation, turn off sound associated with an audio-visual presentation). As another example, detecting a third location (L3) can effectively result in selection of a Media Presentation Environment 124 (MPED3) that includes both media content 125 and media presentation data 127 effectively describing how to present the media content 125. Similarly, locations L4 and L5 can respectively be associated with Media Presentation Environment (MPED) 130 and 132 (MPED4 and MPED5) which effectively define media content and refer to a default (or not-specified, or current) media presentation for the media content, or the reverse, namely, refer to default, not-specified, or current content, but effectively describe how to present media content. It should also be noted that a Media Presentation Environment (MPE) can, for example, include actual data or references to data stored locally or remotely, an indication or identifier to either media content or media presentation data. Referring to FIG. 1B, a configuration file 140 can effectively associate various locations (e.g., L1, L2) with corresponding Media Presentation Environment (MPE) data (e.g., MPED1, MPED2). It should also be noted that each of the Presentation Environment (MPE) data (e.g., MPED1, MPED2), can for example, be downloaded from a computing system 103 (e.g., server, personal computers) shown in FIG. 1A. The Media Presentation Environment (MPE) data can, for example, be obtained as "Webcast" and downloaded to a device. Webcast is similar to a broadcast television program but designed for Internet transmission. Webcast clients allow a user to connect to a server, which is distributing (webcasting) the webcast, and displays the televisual content to the user. As will be discussed below, the Media Presentation Environment (MPE) data can also be defined based on input provided by a human being by interacting, for example, with menus that allow selection of various digital files, items, or collection of digital files or items.

Figure 3:
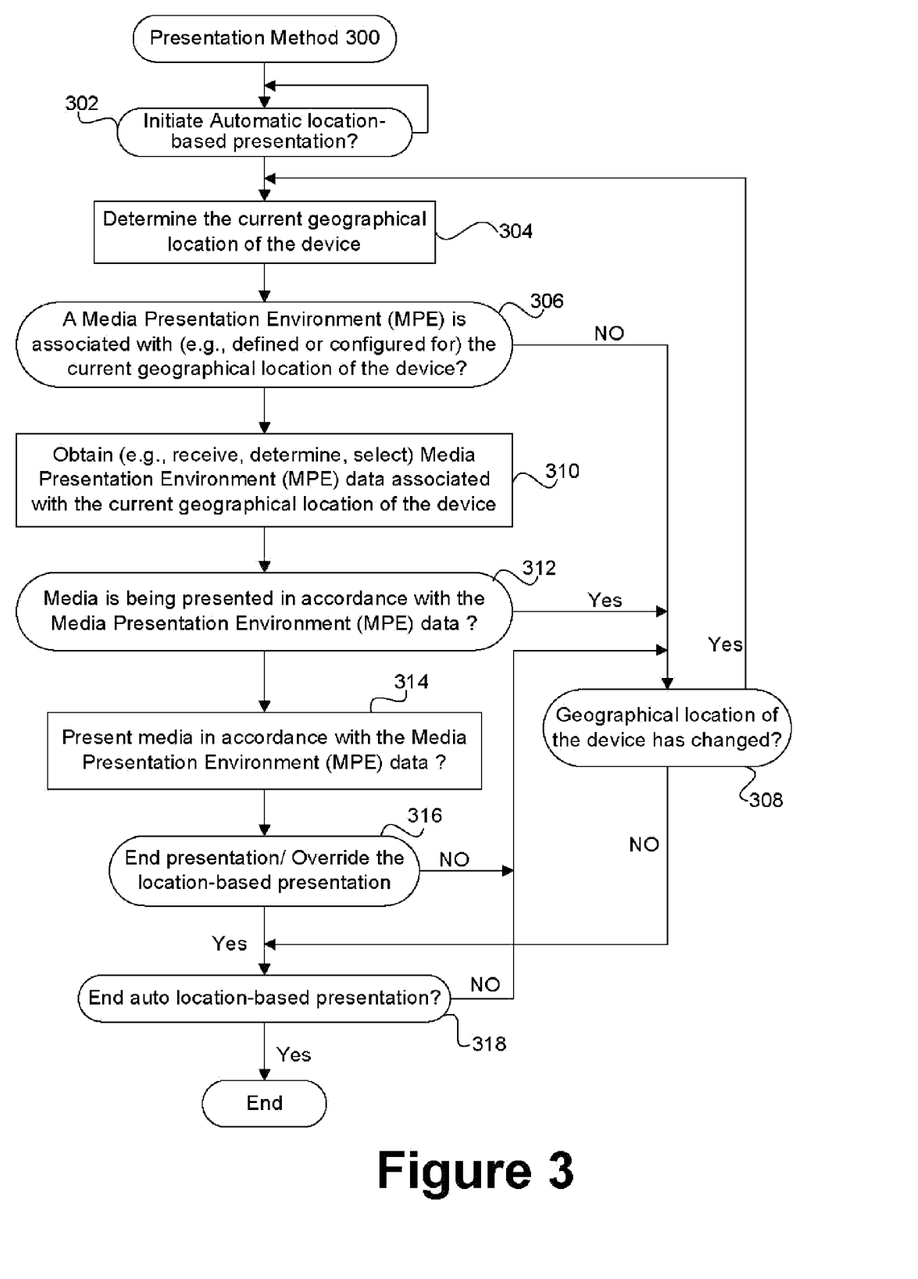
FIG. 3 depicts a presentation method for presenting media on a device in accordance with one embodiment of the invention.

To further elaborate, FIG. 3 depicts a presentation method 300 for presenting media on a device in accordance with one embodiment of the invention. It will be appreciated that the presentation method 300 is especially well suited for presentation of media by a portable, handheld device that can be physically moved from one location to another location (e.g., portable or wireless phone, personal digital assistant, portable media-player, laptop). Referring to FIG. 3, initially, it is determined (302) whether to initiate an automatic location-based presentation option. This option can, for example, be implemented as a user option that can be turned on by a user by pressing a button, entering a text command, or selecting an option displayed in Graphical User Interface. In any case, when it is determined (302) that the automatic location-based presentation has been initiated, the current geographical location of the device is determined (304). Next, it is determined whether a Media Presentation Environment (MPE) is associated (e.g., defined or configured) for the geographical location of the device. If it is determined that a Media Presentation Environment (MPE) is not associated with the current geographical location of the device, it is determined (308) whether the geographical location of the device has changed, so that current location of the device can effectively be determined (306). If it is determined (308) that the geographical location of the device has not changed, it is determined (318) whether to end the automatic location-based presentation option. In effect, the presentation method 300 can wait to detect a change in geographical location or termination of the automatic location-based presentation option, for example, detected in response to specific user input or shutting off of the device.

On the other hand, if it is determined (306) that a Media Presentation Environment (MPE) is associated with the current geographical location of the device, the Media Presentation Environment (MPE) data associated with the current geographical location of the device is obtained (310) (e.g., received, determined, or selected). Next, it is determined (312) whether the media is being presented in accordance with the Media Presentation Environment (MPE) data. If it is determined (312) that media is being presented in accordance with the Media Presentation Environment (MPE) data associated with the current location of the device, the presentation method 300 proceeds to determine (308) whether the geographical location of the device has changed or determine (318) whether the automatic location-based presentation option is terminated.

Figure 4:
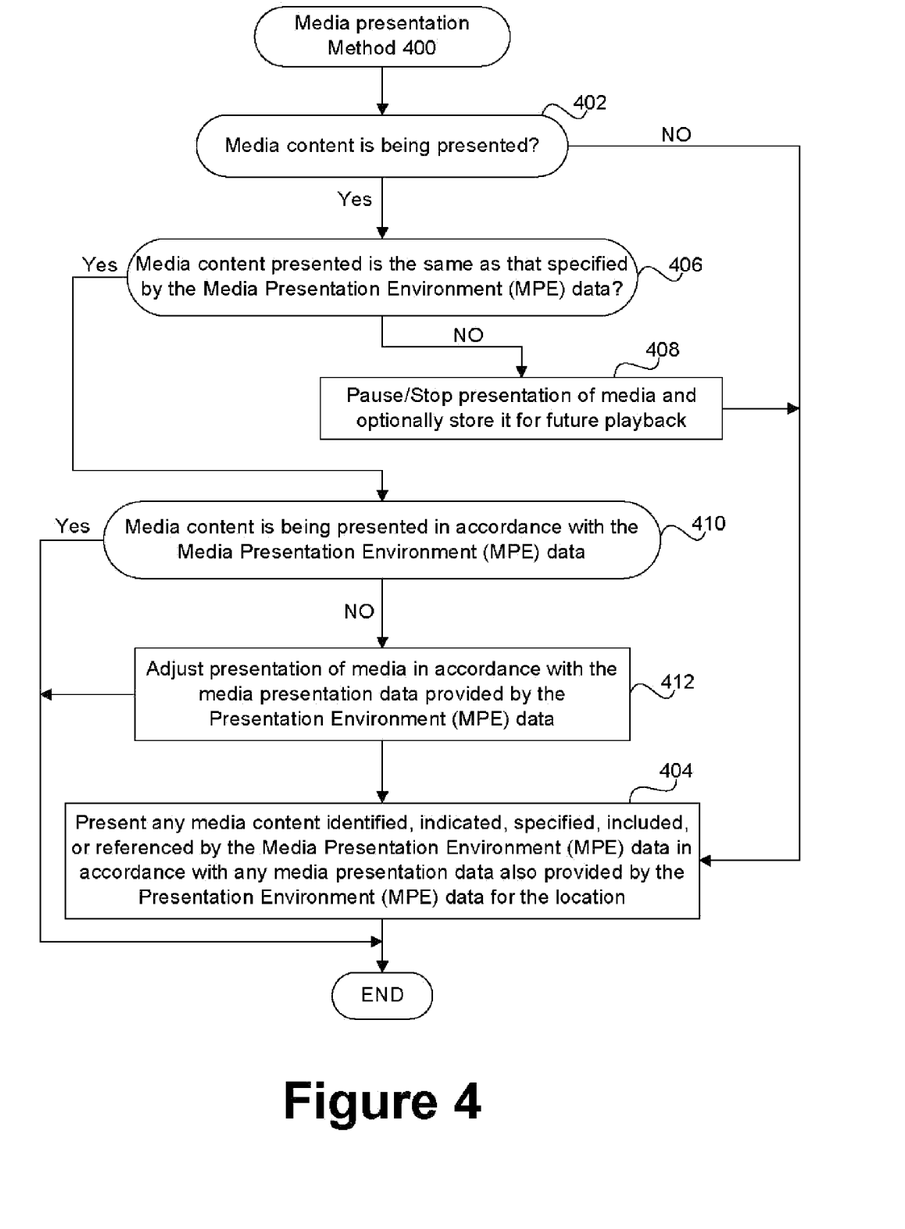
FIG. 4 depicts a media presentation method for presenting media in accordance with Media Environment Presentation (MPE) data in accordance with one embodiment of the invention.

However, if it is determined (312) that media is not being presented in accordance with the Media Presentation Environment (MPE) data associated with the current physical location, media is presented (314) in accordance with the Media Presentation Environment (MPE) data. Determining (312) of whether data is presented in accordance with the Media Presentation Environment (MPE) data and presenting (314) of the media in accordance with the Media Presentation Environment (MPE) data is described in greater detail below (FIG. 4). Referring back to FIG. 3, after the presentation (314) of media in accordance with the Media Presentation Environment (MPE) data, it is determined (316) whether to end the media presentation (e.g., responsive to user request to end the presentation) or override the location-based presentation (e.g., in response to manually selected media). If it is determined (316) not to end the presentation or override the presentation, it is determined (308) whether the geographical location of the device has changed. Thus, the presentation of media can continue until it ends, it is overridden, or a change in the geographical location has been detected (308). The presentation method 300 ends when it is determined to end the automatic location-based presentation option.

FIG. 4 depicts a media presentation method 400 for presenting media in accordance with Media Presentation Environment (MPE) data in accordance with one embodiment of the invention. The media presentation method 400 depicts in greater detail determining (312) of whether media is presented in accordance with a Media Presentation Environment, and subsequently presenting (314) media in accordance with the Media Presentation Environment (MPE) (shown in FIG. 3). Initially, it is determined (402) whether media content is being presented. If it is determined (402) that media content is not being presented, any media content identified, indicated, specified, included, or referenced, by the Media Presentation Environment (MPE) data is presented as indicated by any media presentation data that may be provided as the Media Presentation Environment (MPE) for a particular location. In other words, appropriate media content is presented in accordance with any media presentation data for the location.

On the other hand, if it is determined (402) that media content is currently being presented, it is determined (406) whether the media content being presented is the media content that is effectively defined (e.g., specified, identified, included, referenced) by the Media Presentation Environment (MPE) data. In effect, it is determined (406) whether appropriate content is being presented. As such, if it is determined (406) that the content being presented is not the appropriate content for the location, the presentation of media is paused/stopped (408) in order to allow presentation of media content in accordance with the Media Presentation Environment (MPE) data. It should be noted that media presentation can be optionally stored in order to allow playback at a later time. Thereafter, media content is presented (404) in accordance with the Media Presentation Environment (MPE) data. However, if it is determined (406) that media content presented is the same as the media content effectively defined by the Media Presentation Environment (MPE), it is determined (410) whether the media content is being presented in accordance with the Media Presentation Environment (MPE) data. By way of example, it can be determined (410) whether media is being presented in accordance with one or more presentation attributes associated with presentation of audio and/or video (e.g., volume associated with audio presentation, brightness associated with video presentation). Accordingly, presentation of media can effectively be adjusted in accordance with the Media Presentation Environment (MPE) defined for a particular location. The media presentation method 400 ends following the adjustment (412) of presentation (404) of the media in accordance with the Media Presentation Environment (MPE).

Figure 5A:
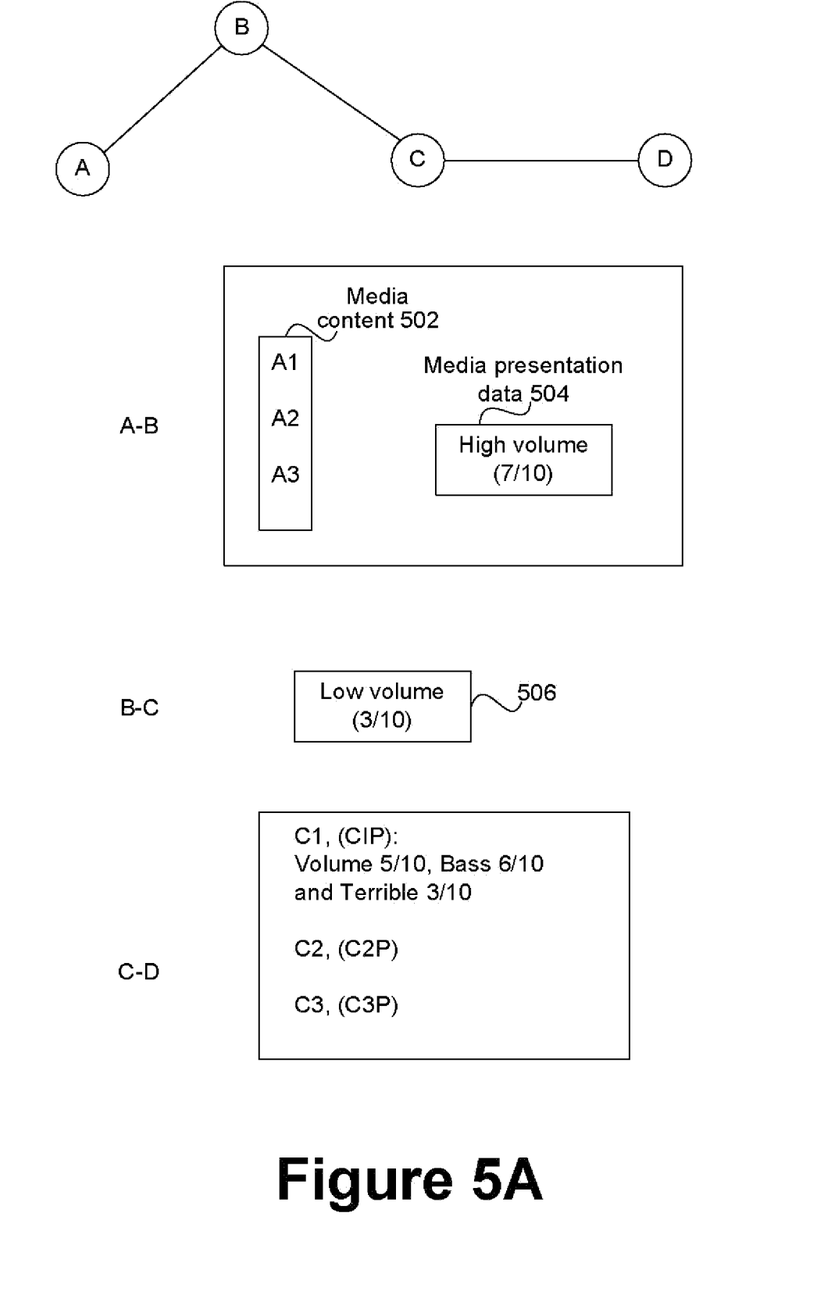
FIGS. 5A-B illustrate use of Media Presentation Environment data in accordance with one embodiment of the invention.
Figure 5B:
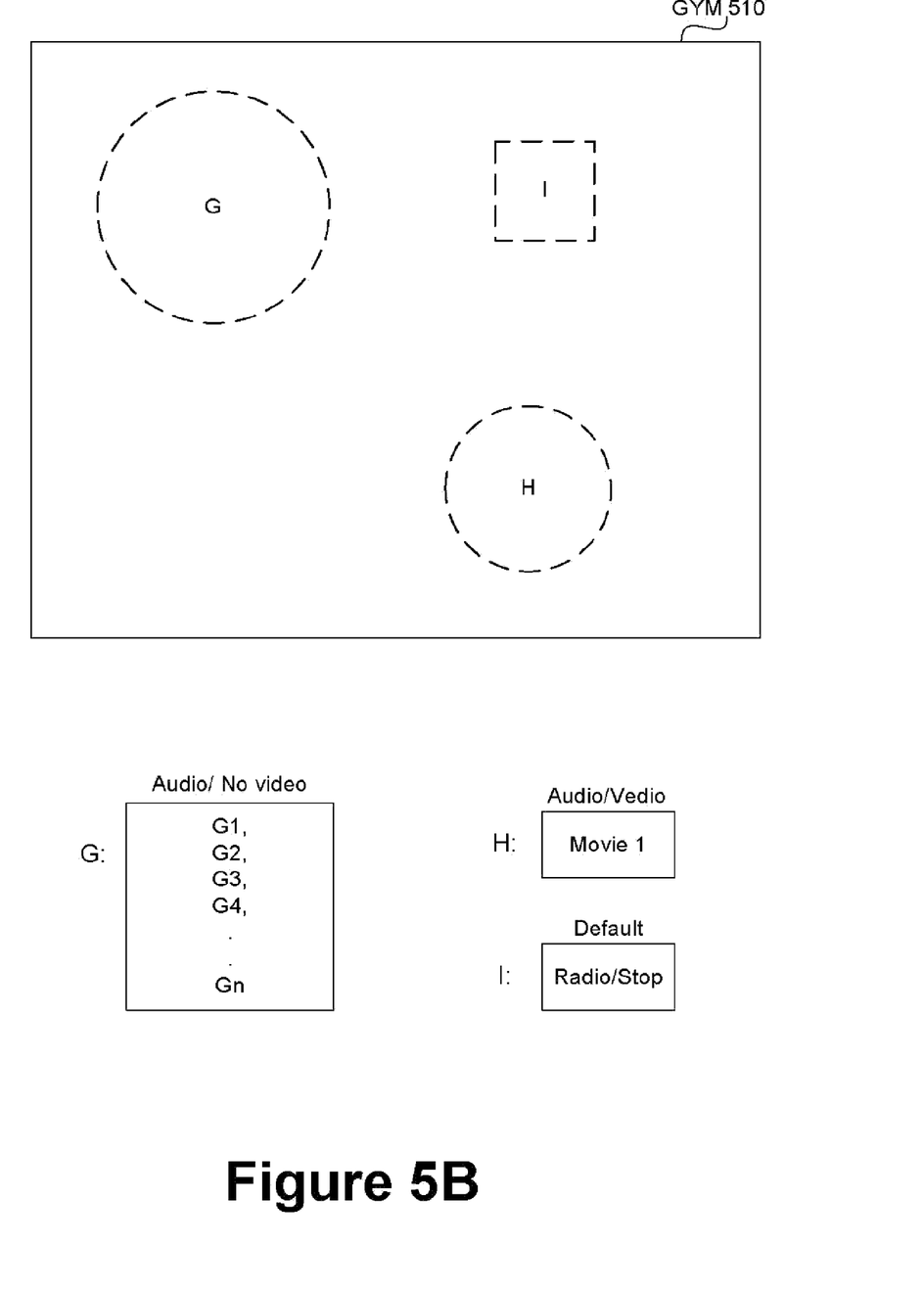

Those skilled in the art will appreciate that Media Presentation Environment can be provided to tailor presentation of media in accordance with various needs or goals. FIG. 5A-B depict Media Presentation Environment data provided in accordance with one embodiment of the invention. More particularly, FIG. 5A depicts a map of a road that can, for example, be used for an athletic event (e.g., biking, running). Referring to FIG. 5A, the distance between points A and B depicts an uphill road and the distance between points B and C depicts a downhill road. A Global Positioning System (GPS) receiver can be configured to detect locations between points A and B (on the hill) and points B and C (downhill). As such, media content 502 can be defined for location between A and B. The media content can, for example, be a list of songs, or a directory or songs (A1, A2, . . . An).

Furthermore, media presentation data 504 can indicate how to present data for points between locations A and B (e.g., higher volume of 7/10). Similarly, media content can be defined for points between B and C. However, referring to the example depicted in FIG. 5A, only media presentation data 506 is provided to effectively present media (i.e., whatever is being presented) at a lower volume of 3/10. Thus, media presentation can be effectively changed at point B to lower the volume. As depicted in FIG. 5A, media content can subsequently be changed when point C is reached to a different play list, or directory (C1, C2, and C3). Furthermore, for each individual media content (e.g., song), a media presentation information (C1P, C2P, C3P) can be provided. It should be noted that the media presentation information can provide one or more media presentation parameters or attributes corresponding to, for example, volume, base, or terrible associated with presentation of a particular media content (C1).

Those skilled in the art will also appreciate that Media Presentation Environment (MPE) can be defined, provided, and effectively used to present media in a particular geographical area, boundary or region. Referring to FIG. 5B, a map of gym 510 is depicted. In a geographical region G (e.g., 1000 square feet), specific audio only content can be defined for presentation. In another region H (e.g., 400 square feet), audio/visual content can be defined. The presentation of media can be automatically changed as a user moves from area G to area H. Media presentation can, for example, automatically default to radio or stopped/paused when the user enters area I.

It should be noted that Media Presentation Environment (MPE) can be defined. As noted above, the invention is especially well suited for portable or mobile devices that can present digital media. One example of such device is a portable multimedia device, or a media player depicted in FIG. 6. Media Presentation Environment (MPE) can be effectively defined by a user of the media player by selecting various media "assets" (e.g., songs, albums, a list of artists). Moreover, in order to define (e.g., select) various media assets for different locations, similar mechanism can be used as those used to effectively select media assets for presentation. One example of such mechanisms is described in patent application Ser. No. 10/282,861, entitled "GRAPHICAL USER INTERFACE AND METHODS OF USE THEREOF IN A MULTIMEDIA PLAYER," filed on Oct. 28, 2002, which is hereby incorporated by reference herein for all purposes.

Figure 6:
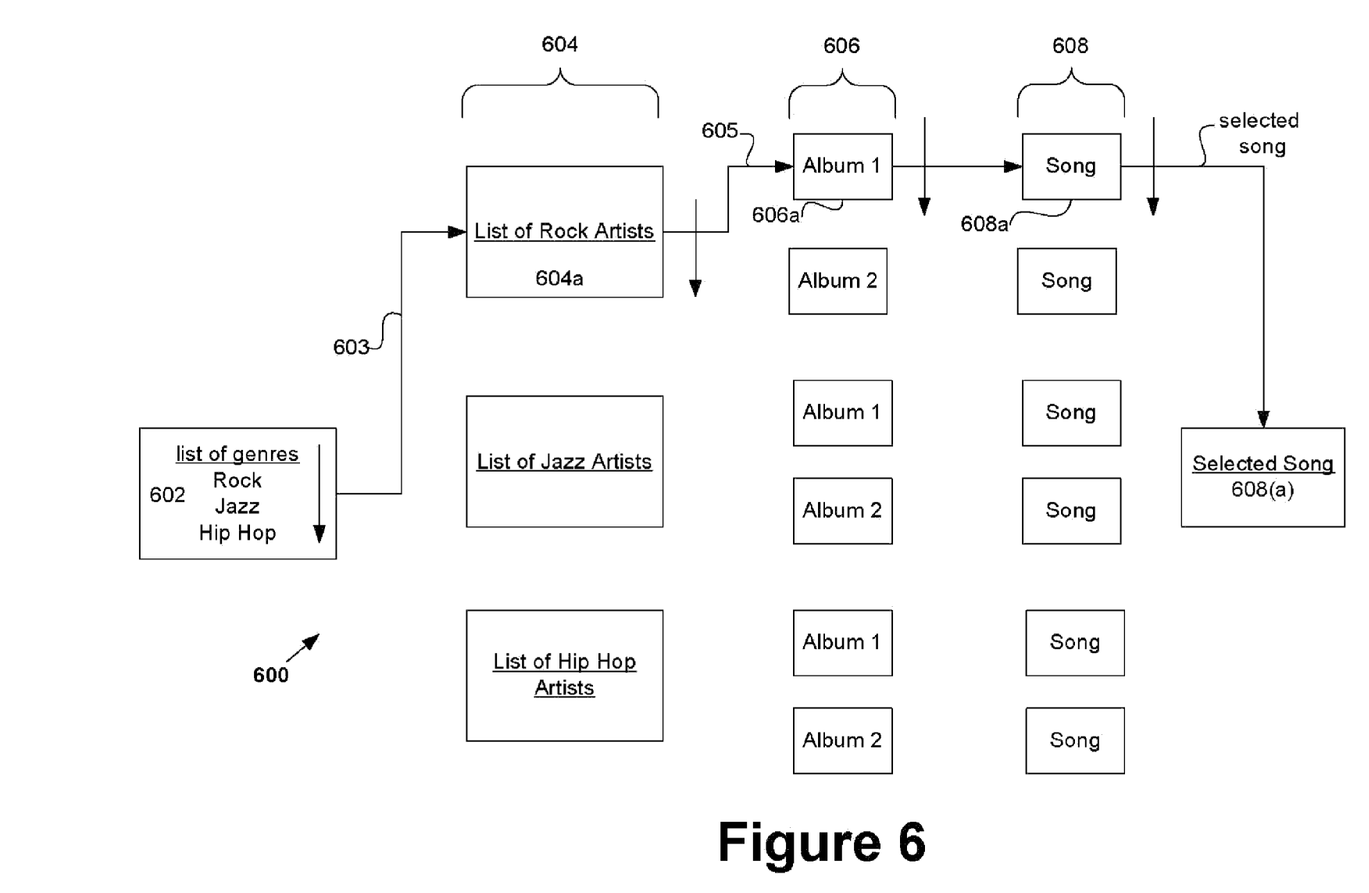
FIG. 6 depicts a hierarchically ordered menu for navigating through media assets for media assets that may be of interest to a user in accordance with one embodiment of the invention.

FIG. 6 depicts a hierarchically ordered menu 600 for navigating through media assets for media assets that may be of interest to a user. The hierarchically ordered menu 600 can be used to define a Media Presentation Environment for a particular item in accordance with one embodiment of the invention. Referring to FIG. 6, it should be noted that the menu 600 can, for example, be navigated by a user scrolling vertically within a particular level in order to peruse and eventually select a particular item located within that level. Once selected, the menu 600 is automatically transitioned in a horizontal manner to a lower order interface associated with the selected item. For example, at a first level, a list of music genres 602 (Rock, Jazz, Hip Hop) corresponding to the available MP3 files is displayed. In order to select a particular music genre, a user scrolls "vertically down" the list 602 (usually accompanied by a pointer such as an arrow or by highlighting the adjacent item) until a desired input item is reached. Upon selecting a particular music genre (Rock, for example), an automatic horizontal traversal 603 to a lower order interface 604 that includes a display of a list of Rock artists 604a corresponding to the selected Rock genre. Again after scrolling in a vertical direction in the Rock artists list 604a, a user selects a particular one of the listed Rock artists included in the list 604a resulting in another automatic horizontal traversal 605 to a lower order interface 606 denoting an album 606a (from a list of albums 606, if appropriate) associated with the selected artist. This procedure is continued until a particular song 608a from a list of songs 608 (included in the selected album) is selected.

Figure 7:
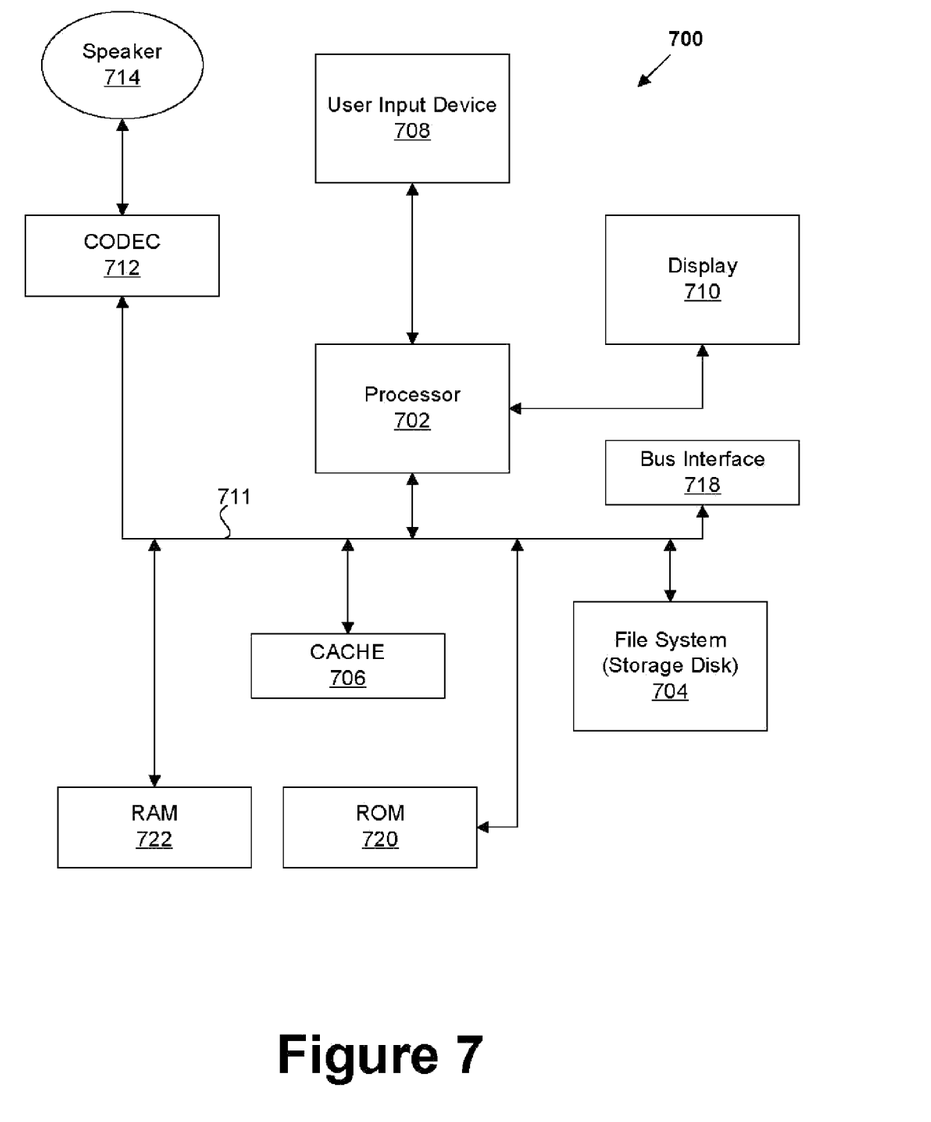
FIG. 7 shows an exemplary portable multimedia device, or media player, in accordance with one embodiment of the invention.

FIG. 7 shows an exemplary portable multimedia device, or media player, 700 in accordance with one embodiment of the invention. The media player 700 includes a processor 702 that pertains to a microprocessor or controller for controlling the overall operation of the media player 700. The media player 700 stores media data pertaining to media assets in a file system 704 and a cache 706. The file system 704 is, typically, a storage disk or a plurality of disks. The file system 704 typically provides high capacity storage capability for the media player 700. However, since the access time to the file system 704 is relatively slow, the media player 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is particularly important when the media player 700 is a portable media player that is powered by a battery (not shown). The media player 700 also includes a RAM 722 and a Read-Only Memory (ROM) 720. The ROM 720 can store programs, utilities or processes to be executed in a non-volatile manner. The RAM 722 provides volatile data storage, such as for the cache 706.

The media player 700 also includes a user input device 708 that allows a user of the media player 700 to interact with the media player 700. For example, the user input device 708 can take a variety of forms, such as a button, keypad, dial, etc. Still further, the media player 700 includes a display 710 (screen display) that can be controlled by the processor 702 to display information to the user. A data bus 711 can facilitate data transfer between at least the file system 704, the cache 706, the processor 702, and the CODEC 712. The media player 700 also includes a bus interface 718 that can couple to a data link that allows the media player 700 to connect to a host computer.

In one embodiment, the media player 700 serves to store a plurality of media assets (e.g., songs) in the file system 704. When a user desires to have the media player play a particular media item, a list of available media assets is displayed on the display 710. Then, using the user input device 708, a user can select one of the available media assets. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the media player 700 or external to the media player 700. For example, headphones or earphones that connect to the media player 700 would be considered an external speaker.

For example, in a particular embodiment, the available media assets are arranged in a hierarchical manner based upon a selected number and type of groupings appropriate to the available media assets. For example, in the case where the media player 700 is an MP3 type media player, the available media assets take the form of MP3 files (each of which corresponds to a digitally encoded song or other audio rendition) stored at least in part in the file system 704. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, while at a fourth level a list of songs for each album listed in the third level, and so on.

What is claimed is:

1. A portable computing device, comprising:
one or more processors; and
memory coupled to the one or more processors, wherein the one or more processors are configured to:
receiving user input specifying one or more Media Presentation Environments (MPEs) for a plurality of locations;
define MPE data for the plurality of locations using the user input, wherein not every location has defined MPE data, and wherein defining the MPE data for the plurality of locations includes:
associating a first MPE with a first location in the plurality of locations, and
associating a second MPE with a second location in the plurality of locations, an MPE for a location specifying a set of media assets to be presented at the location;
determine a current location of the portable computing device using a location determination component on the portable computing device;
determine whether a first particular MPE is associated with the current location using an automatic location-based presentation option, the first particular MPE specifying a first particular set of media assets to be presented at the current location;
after determining that the first particular MPE is associated with the current location, automatically present the first particular set of media assets on the portable computing device in accordance with the first particular MPE associated with the current location;
after determining that a first particular MPE is not associated with the current location, determine whether a location of the portable computing device has changed to a new location;
after determining that the location of the portable computing device has changed to the new location, determine whether a second particular MPE is associated with the new location, the second particular MPE specifying a second particular set of media assets to be presented at the new location;
after determining that the second particular MPE is associated with the new location, determine whether the second particular set of media assets are being presented in accordance with the second particular MPE;
after determining that the second particular set of media assets are not being resented in accordance with the second particular MPE, adjusting presentation of the second particular set of media assets in accordance with the second particular MPE; and
determine whether to terminate cation-based presentation option based on a user request.

2. The portable computing device of claim 1, wherein said current location is a physical location.

3. The portable computing device of claim 1, wherein said MPE is defined based on input provided by a human user interacting with a menu on said portable computing device.

4. The portable computing device of claim 2, wherein said MPE data is based solely on the physical location of said portable computing device.

5. A method for providing digital media on a media playback device, said method comprising:
receiving, by a portable computing device, user input specifying one or more Media Presentation Environments (MPEs) for a plurality of locations;
defining, by the portable computing device, MPE data for the plurality of locations using the user input, wherein not every location has defined MPE data, and wherein defining the MPE data for the plurality of locations includes:
associating a first MPE with a first location in the plurality of locations, and associating a second MPE with a second location in the plurality of locations, an MPE for a location specifying a set of media assets to be presented at the location;

determining a current location of the portable computing device using a location determination component on the portable computing device;

determining whether a first particular MPE is associated with the current location using an automatic location-based presentation option, the first particular MPE specifying a first particular set of media assets to be presented at the current location;

after determining that the first articular MPE is associated with the current location, automatically causing the first particular set of media assets to be presented on the portable computing device in accordance with the first particular MPE associated with the current location;

after determining that a first particular MPE is not associated with the current location, determining whether a location of the portable computing device has changed to a new location;

after determining that the location of the portable computing device has changed to the new location, determining whether a second particular MPE is associated with the new location, the second particular MPE specifying a second particular set of media assets to be presented at the new location;

after determining that the second particular MPE is associated with the new location, determining whether the second particular set of media assets are being presented in accordance with the second particular MPE;

after determining that the second particular set of media assets are not being presented in accordance with the second particular MPE, adjusting presentation of the second articular set of media assets in accordance with the second articular MPE; and determining whether to terminate the automatic location-based presentation option based on a user request.

6. The method of claim 5, wherein said set of media assets comprises a song, an album, a list of sings, a list of albums, a list of artists, a list of genres, or any combination thereof.

7. The method of claim 5, wherein said set of media assets can be selected via menus provided by said portable computing device.

8. The method of claim 5, wherein said MPE data is defined based on input provided by a user interacting with the portable computing device.

9. The method of claim 5, wherein said current location is a physical location of the portable computing device.

10. The method of claim 9, wherein said physical location is defined as a geographical area, boundary, region, or distance between two physical locations.

11. A non-transitory computer readable storage medium encoded with a set of instructions that; when executed, causes a processor in a portable computing device to execute a method comprising:

receiving user input specifying one or more Media Presentation Environments (MPEs) for a plurality of locations;

defining MPE data for the plurality of locations using the user input, wherein not every location has defined MPE data, and wherein defining the MPE data for the plurality of locations includes:

associating a first MPE with a first location in the plurality of locations, and associating a second MPE with a second location in the plurality of locations, an MPE for a location specifying a set of media assets to be presented at the location;

determining a current location of the portable computing device using a location determination component on the portable computing device;

determining whether a first particular MPE is associated with the current location using an automatic location-based presentation option, the first particular MPE specifying a first particular set of media assets to be presented at the current location;

after determining that the first particular MPE is associated with the current location, automatically causing the first particular set of media assets to be presented on the portable computing device in accordance with the first particular MPE associated with the current location;

after determining that a first particular MPE is not associated with the current location, determining whether a location of the portable computing device has changed to a new location:

after determining that the location of the portable computing device has changed to the new location, determining whether a second particular MPE is associated with the new location, the second particular MPE specifying a second particular set of media assets to be presented at the new location;

after determining that the second particular MPE is associated with the new location, determining whether the second particular set of media assets are being presented in accordance with the second particular MPE, after determining that the second particular set of media assets are not being presented in accordance with the second particular MPE, adjusting presentation of the second particular set of media assets in accordance with the second particular MPE; and determining whether to terminate the automatic location-based presentation option based on a user request.

12. The computer readable storage medium of claim 11, wherein said set of media assets comprises a song, an album, a list of sings, a list of albums, a list of artists, a list of genres, or any combination thereof.

13. The computer readable storage medium of claim 11, wherein said current location is a physical location.

14. The computer readable storage medium of claim 11, wherein said MPE is defined based on input provided by a human user interacting with a menu on said portable computing device.

15. The portable computing device of claim 1, wherein each location includes a region with a specified boundary.

16. The method of claim 5, further comprising:

after automatically presenting the first particular set of media assets in accordance with the first particular MPE, determining whether the location of the portable computing device has changed to the new location;

after determining that the location of the portable computing device has changed to the new location, determining whether the second particular MPE is defined for the new location; and after determining that the second particular MPE is not defined for the new location, continuing to cause the first particular set of media assets to be presented in accordance with the first particular MPE.

17. The method of claim 5, wherein the user input specifies one or more media presentation parameters for how a first media asset of the first MPE is to be presented at the first location, the method further comprising:

presenting the first media asset in accordance with the one or more media presentation parameters when the current location is the first location.

18. The method of claim 17, wherein the one or more media presentation parameters are selected from the group consisting of volume, bass, treble, and brightness.

19. The method of claim 5, wherein the user input specifies one or more media presentation parameters for how the first particular set of media assets is to be presented at the current location, and wherein the first particular set of media assets is presented in accordance with the one or more media presentation parameters at the current location.

* * * * *